United States Patent [19]
Fu et al.

[11] Patent Number: 5,494,513
[45] Date of Patent: Feb. 27, 1996

[54] ZEOLITE-BASED LIGHTWEIGHT CONCRETE PRODUCTS

[75] Inventors: Yan Fu; Jian Ding, both of Hull; James J. Beaudoin, Gloucester, all of Canada

[73] Assignee: National Research Council of Canada, Ottawa, Canada

[21] Appl. No.: 499,458

[22] Filed: Jul. 7, 1995

[51] Int. Cl.⁶ ..................................... C04B 14/04
[52] U.S. Cl. .................... 106/672; 106/680; 106/700; 106/736; 106/737; 106/788; 106/813; 106/819
[58] Field of Search .................... 106/672, 737, 106/813, 788, 736, 819, 680; 423/700

[56] References Cited

U.S. PATENT DOCUMENTS

| | | | |
|---|---|---|---|
| 3,887,385 | 6/1975 | Quist et al. | 106/668 |
| 4,435,216 | 3/1984 | Diehl et al. | 106/713 |
| 5,383,967 | 1/1995 | Chase | 106/715 |
| 5,435,846 | 7/1995 | Tatematsu et al. | 106/813 |

FOREIGN PATENT DOCUMENTS

| | | | |
|---|---|---|---|
| 3132928 | 1/1983 | Germany | 106/813 |
| 550814 | 6/1978 | U.S.S.R. | 106/813 |

*Primary Examiner*—Anthony Green
*Attorney, Agent, or Firm*—Juliusz Szereszewski

[57] ABSTRACT

Lightweight concrete products, useful for example in blocks, wall panels, floor and roof slabs, in which zeolite is a major component, its content in the cementing material of the products exceeding 50 wt. %. Depending on application, zeolite may be non-treated or calcined at a temperature enabling the surface activation of the zeolite and resulting high surface energy. Zeolite thus treated will work as both pozzolanic material and bubble-generating agent. Strengthening agents are used to improve compressive strength of the products. Also, a binding material, useful for hazardous waste stabilization, comprising zeolite as a major component, is proposed.

23 Claims, 1 Drawing Sheet

ZEOLITE-BASED LIGHTWEIGHT CONCRETE PRODUCTS

BACKGROUND OF THE INVENTION

1. Field of Invention

The present invention relates to lightweight concrete products, and more particularly, to such products where zeolite is a major component; and in one aspect, to a zeolite-based binding material for use in hazardous waste stabilization.

2. Description of Prior Art

Conventional lightweight concrete products are made of Portland cement and/or lime, together with slag, pulverized fuel-ash, and other siliceous fine aggregates. Air or other gas (usually hydrogen from the reaction of aluminum powder in lime water) is introduced into a slurry composed of these materials to produce aerated or cellular concrete products. A uniform cellular structure is formed when the mixture sets. Autoclave curing is generally necessary if lightweight concrete products are to be produced with an acceptable level of strength and production yield.

Zeolite powder can be made by grinding either synthetic zeolite or natural zeolite minerals. Zeolite powder can be pre-treated depending on the application. A hydraulic cement is a dry powder which, upon mixing with water, sets and becomes a hardened solid mass forming a water-resistant product. Lime contains mainly calcium oxide or calcium hydroxide.

Zeolite is a porous silicoaluminate mineral. It has a very large surface area generally greater than 20 m$^2$/g. Its solid surface can be activated to have high surface energy after calcination at temperatures greater than 400° C. When subsequently immersed in water, the surface generates a large amount of air and heat due to adsorption. This heat increases the temperature of the air in pores or adsorbed on the surface of zeolite particles. The expansion of the air volume results in foaming and volume expansion of fresh concrete during the mixing and pre-storage periods. In addition to its foaming function, zeolite can also react with calcareous materials to form calcium silicoaluminate hydrates which contribute to the strength of the concrete. Therefore zeolite has the potential for use as a basic raw material to produce aerated concrete.

The use of zeolite minerals in Portland cement to increase strength and decrease porosity has been described in PCT Int. Appl. WO 92 17,413, to R. S. Chase. The Chase patent application indicates that zeolite, as do other $SiO_2$-containing materials, has the pozzolanic activity required to contribute strength of Portland cement-based cementitious binders. No claims for other uses of zeolite (e.g., its air-generating capabilities) different from those of conventional pozzolanic materials such as fly ash, slag and silica fume were made. A similar patent was issued in U.S.S.R (see SU 1,738,774, to G. I. Ovcharenko et al., 1992). The Ovcharenko patent describes a composition of blended cement containing 15–30wt. % zeolite, 40–60 wt. % gypsum and 18–40 wt. % Portland cement.

The use of zeolite in production of lightweight aerated building materials has been reported in JP 03 93,661 to S. Kureha et al, 1991. According to that disclosure, zeolite was utilized in relatively small amounts, e.g., 20 wt. % zeolite, 80 wt. % cement and water/solid ratio 0.7. Zeolite was calcined at 500° C. and cooled at −20° C. The aerated concrete had a bulk density of 420 kg/m$^3$ after steam-curing at 70° C. for 5 hours. A relatively larger amount of zeolite, up to 50% by weight of total cementing material was used in production of lightweight concrete (JP5-294749 and JP5-294750). The disclosed material comprises about 47 wt. % zeolite, 43 wt. % Portland cement, 10 wt. % quick lime and 0.07 wt. % aluminum powder. Aluminum powder, a conventional foaming agent in the production of aerated concrete, was still used in these two patent applications to provide cellular structure in the lightweight concrete. Zeolite functioned therein only as a siliceous material in the concrete composition instead of silica powder or fly ash generally used in conventional aerated concrete production.

Utilization of natural zeolite in the production of aerated concrete was reported in "Properties of zeolite as an air-entraining agent in cellular concrete", Cement, Concrete and Aggregates, CCAGDP, Vol. 14, No. 1, pp. 41–49, Naiqian Feng, 1992. The natural zeolite was calcined at about 500° C. for 2 hours. The particle size of the zeolite used was less than 1.2 mm. The suggested mix proportions were 31–48 wt. % ordinary Portland cement, 19–38 wt. % zeolite and 30–38 wt. % water. The compressive strength of aerated concrete after moist-curing at 20° C. for 28 days was in the range of 4.1 to 5.3 MPa and its dry density was in the range of 750 to 850 kg/m$^3$.

Zeolite has been used as an industrial adsorbent in hazardous waste treatment. The trapped ions in some natural zeolite products include $NH_4$, Cu, Pb, Zn, Cd, Sr and Cs. Natural zeolite has been utilized in large-scale ion exchange processes to concentrate and isolate radioactive strontium and cesium from waste streams of nuclear facilities (see, "Zeolitic extraction of cesium from aqueous solution" Unclassified Report HW-62607, US Atomic Energy Commission, 23 pp., L. L. Ames, 1960). Studies involving natural zeolites as collectors of radioactive wastes have been and are being carried out in France, Italy, Great Britain, Hungary, Bulgaria, Mexico, Canada and Japan (see "Influences of clinoptilolite on Sr-90 and Cs-137 uptakes by plants" Soil Science, Vol 114, p.149, H. Nishita and R. M. Haug, 1972). It was also reported that natural zeolite can be used in a mobile exchange unit to successfully remove 97% of ammonium from sewage streams and agricultural effluents (see, "Ammonia removal from secondary effluents by selective ion exchange", Water Pollution Control Federation Journal, Vol. 42, p. R95, B. W. Mercer, 1970). An alkali-activated-slag based binding material containing 10–30% zeolite by weight of slag has been reported for the stabilization of strontium and cesium ions (see, "Immobilization of simulated high level waste into AASC waste form" Cement and Concrete Research, Vol 24, p. 133, X. Shen et al., 1994). Low leach rates of about 10$^{-5}$ and 10$^{-6}$ g/cm$^2$●day for Cs and Sr ions respectively were obtained when the equivalent $Cs_2O$ or SrO content was about 25% by weight of the binding material.

It has been reported that ettringite, hydrated calcium sulphoaluminate which has a structure $Ca_6[Al(OH)_6]_2(SO_4)_3 26H_2O$, can form from $Al_2O_3{}^{--}$ of the pozzolans when sulphate and calcium exist in the hydration system. The rate of ettringite formation from pozzolans is notably superior to the rate of ettringite formation from $C_3A$ of the Portland cement (see "Ettringite from Portland cement origin and ettringite from pozzolanic origin: analogies, differences and semiquantitative relations with their respective origins: interrogations", 9th international congress on the chemistry of cement, p.343, R. Talero, 1993). Ettringite is well known both as a naturally occurring mineral and in the technology of cements as a product of the reaction of calcium sulphate with the calcium aluminates in aqueous media. Research has shown that the substitution of Al in ettringite by Ti, Cr, Mn and Fe leads to the formation of similar compounds of the type $Ca_6[M(OH)_6]_2(SO_4)_3 26H_2O$, which undergo extensive solid solution with each other Replacement of the $SO_4^{2-}$ ions by $CrO_4^{2-}$ ions is also reported to give the compound chromate-ettringite $Ca_6[Al(OH)_6]_2(CrO_4)_3 26H_2O$, that is isomorphous with ettringite. When calcium oxide is replaced by strontium oxide for the reaction with hydrated aluminum sulphate in water, strontium sulphoaluminate hydrate is formed which bears a close structural relationship to ettringite (see "Studies of ettringite and its derivatives", Cement Technology, Vol. 2, Part 3, p.73, 1971; "Studies of ettringite and its derivatives. Part II: Chromate substitution", Silicates Industrials, Vol 23, 1972; "Studies of ettringite and its derivatives, Part III: Investigations of strontium and barium substitution in ettringite", Cement Technology, Sept/Oct, 1972, J. Bensted and S. P. Varma). It has been concluded with respect to the utilization of cement-based solidification techniques that the fixation of metals (such as zinc and mercury) in the cementitious system is mainly attributed to substitution in the Aft phase, e.g. ettringite (see "Mechanisms of metal fixation and leaching by cement based fixation processes", Waste Management & Research, Vol. 3, p.127, C. S. Poon, A. I. Clark, C. J. Peters and R. Perry, 1985). The materials used for solidification are usually based on Portland cement and high alumina cement. Since, however, only a small part of the components, e.g. ettringite, in these materials is effective for the adsorption and fixation of toxic ions, the problems related to leakage of toxic ions from those solidified waste materials remain.

High content of zeolite in concrete compositions is economically advantageous since zeolites are abundant and relatively inexpensive. However, as stated expressly in the Japanese patent application No JP5-294750, when the zeolite content in prior art concrete compositions exceeds certain limit, the compressive strength of the resulting concrete product suffers.

SUMMARY OF THE INVENTION

It is an object of this invention to provide a lightweight concrete product in which natural zeolite is a major component.

It is another object of this invention to provide an aerated concrete product in which pre-treated natural zeolite or synthetic zeolite is a major component.

It is yet another object of this invention to provide a formulation of a lightweight, high-strength concrete product in which pre-treated natural zeolite is a major component.

It is still another object of this invention to provide a binding material in which natural zeolite is a major component, for use in hazardous waste stabilization.

It is a further object of this invention to provide methods of pre-treatment of natural zeolite for use in the production of lightweight concrete products.

It is yet another object of this invention to provide methods of production of lightweight concrete products, including mixing, aerating, pre-storage and hardening.

According to a first aspect of the invention, there is provided a lightweight concrete composition, or product, comprising 40–100 wt. % cementing material and 0–60 wt. % aggregate, and having dry bulk density 300–1600 kg/m³ and compressive strength 0.3–35 MPa after 3–6 hours autoclave curing at 170°–180° C., or after 8–14 hours moist-curing at 75°– 85° C., or after 28 days moist-curing at 23° C. wherein said cementing material comprises about 50–80 wt. % of zeolite which is either non-calcined or calcined above 800° C. 20–49 wt. % Portland cement and 1–8 wt. % strengthening agent.

According to a second aspect of the invention, there is provided a lightweight concrete product comprising 40–100 wt. % cementing material and 0–60 wt. % aggregate, and having dry bulk density 1000–1600 kg/m³ and compressive strength 4– 18 MPa after 3–6 hours autoclave curing at 170°–180° C., or after 8–14 hours moist-curing at 75°–85° C., or after 28 days moist-curing at 23° C., wherein the cementing material comprises 60–80 wt. % zeolite which is either non-calcined or calcined at above 800° C. 10–20 wt % lime, 0–15 wt. % silica flour and 1–8 wt. % strengthening agent.

According to a third aspect of the invention, there is provided a lightweight concrete product comprising 40–100 wt. % cementing material and 0–60 wt. % aggregate, and having compressive strength 0.3–12 MPa and dry bulk density of 300–1100 kg/m³ after 3–6 hours of autoclave curing at 170°– 180° C., wherein the cementing material comprises 55–79 wt. % of zeolite calcined at 400°–600° C., 20–44 wt. % Portland cement, 0–5 wt. % lime, 0–10 wt. % silica flour and 1–8 wt. % strengthening agent.

In the above embodiments of the present invention, the aggregate may be crushed zeolite rock having the particle size of 2–6 mm, or, alternatively, a construction sand. Further, wollastonite may be added to the above products in an amount effective to prevent or reduce crack formation due to drying shrinkage.

In the last of the above embodiments, an air-bubble-stabilization agents may be used in an amount effective to stabilize and optimize the cellular structure of the product.

According to a fourth aspect of the invention, there is provided a binding material for use in hazardous waste stabilization, comprising 40–60 wt. % zeolite, 15–20 wt. % lime, 15–20 wt. % calcium sulphate hemihydrate ($CaSO_4 \bullet \frac{1}{2}H_2O$), 3–8 wt. % sodium sulphate and 0–8 wt. % aluminum sulphate, having a setting time about 10–20 minutes and compressive strength 5–15 MPa after 28 days moist-curing at 23° C. or after 8–14 hours moist-curing at 75°–85° C.

DESCRIPTION OF THE INVENTION

The use of natural or synthetic zeolites as the major component in the production of lightweight concrete products and binding materials is described hereinbelow.

Zeolites are framework aluminosilicates; their structures consist of a three-dimensional framework of $SiO_4$ and $AlO_4$ tetrahedra. Compositionally, zeolites may be given the general formula:

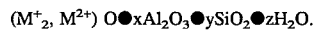

where $M^+$ is usually Na or K; $M^{2+}$ is Mg, Ca, or Fe.

Mixtures containing 30–80 wt. % non-treated zeolites, 20–70 wt. % Portland cement and 0–5 wt. % lime require large amounts of water to satisfy workability requirements. The water/solid ratio can be greater than 0.7. High water/solid ratio gives the products a lightweight characteristic. Zeolites have high pozzolanic activity and react with calcium hydroxide produced during cement hydration or with added lime to contribute to strength. The density and compressive strength of zeolite-based lightweight concrete products containing 50–80 wt. % natural zeolite, 20–50 wt. % Portland cement and 0–5% lime are in the range of 1000–1300 kg/m$^3$ and 10–30 MPa respectively depending on zeolite source after 3–6 hours autoclave curing at 170°–180° C., or after 8–14 hours moist-curing at 75°–85° C., or after 28 days moist-curing at 23° C.

Heat treatment in the range of 400°–600° C. will activate the surface of zeolites and result in high surface energy. Heat-treated zeolites release large amounts of air from their surface after re-wetting as water is readsorbed on the zeolite surface. Heat generation during air desorption and water adsorption increases air bubble formation in the mixture. Heat-treated zeolites in this temperature range can be used as both air-generation agents and pozzolanic binding materials to produce aerated-lightweight concrete products. The density and strength of the products containing 50–80 wt. % of heat-treated zeolite, 20–50 wt. % Portland cement and 0–5% lime are in the range 400–1000 kg/m$^3$ and 2–10 MPa respectively, depending on zeolite type, after 3–6 hours autoclave curing at 170°–180° C.

Heat treatment at temperatures greater than 800° C. will decompose the structure of zeolites. Zeolites lose their air-generation characteristics after this heat-treatment. A mixture containing such zeolites has satisfactory workability with lower water/solid ratio. The hardness of zeolite particles after high temperature calcination appears to increase. Zeolite-based lightweight concrete products containing 50–80 wt. % of zeolites treated at high temperature (800°–1000° C.), 20–50 wt. % Portland cement and 0–5 wt. % lime have compressive strength greater than 20 MPa after 3–6 hours autoclave curing at 170°–180° C., or after 8–14 hours moist-curing at 75°–85° C., or after 28 days moist-curing at 23° C.

Figure 1:
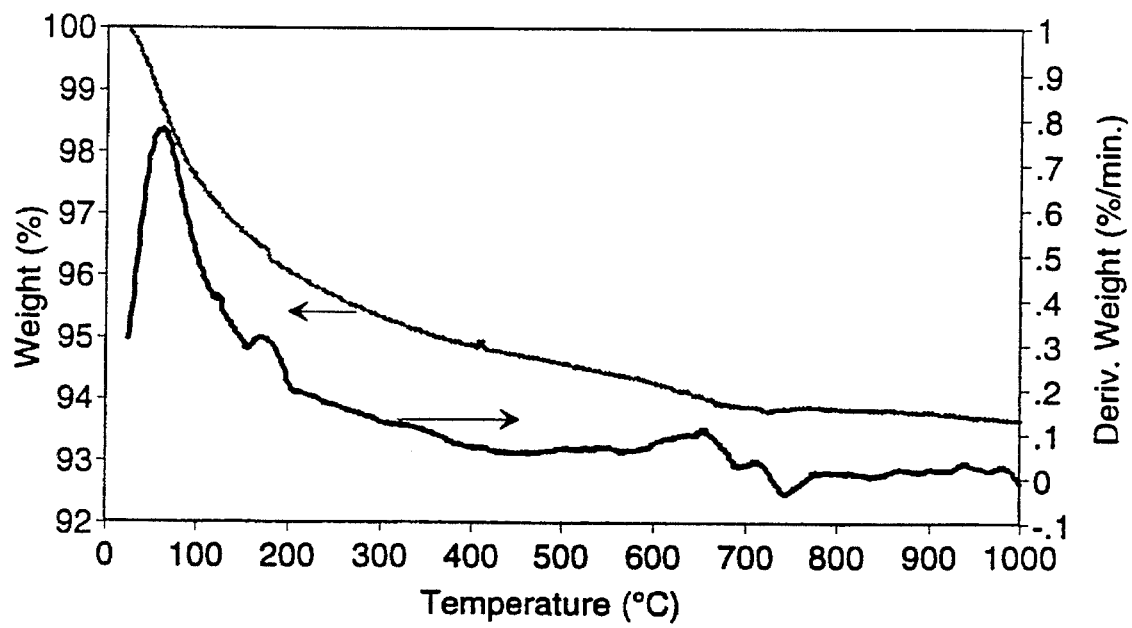
FIG. 1 illustrates thermogravimetric analysis of the weight loss of zeolite during calcination.

The effect of calcination on the characteristics of zeolites can be demonstrated by thermogravimetric analysis (TGA, FIG. 1). The weight loss of zeolite, indicating the degree of dehydration, is about 17% (83% left) at 500° C. and about 3% (97% left) at 800° C. It is believed that activated surface area increases correspondingly to the release of adsorbed water from the surface and interlayers of the zeolite. The higher weight loss at 500° C. indicates that the zeolite may have been activated to a higher level of surface energy. The first peak in TGA derivative curve of the zeolite occurs at around 80° C. This is attributed to the loss of capillary water. The second and third peaks at about 180° and 550° C. may be due to the loss of interlayer water. The fourth peak at 650° C. and further peaks after 800° C. are believed to result from the dehydration of the zeolite structural water. Calcination of zeolite at the temperatures lower than 600° C. does not appear to change its mineral composition as indicated by X-ray diffraction (XRD). Zeolite calcined at 550° C. has the same XRD spectrum as the natural zeolite. The mineral decomposes when calcined at 800° C. as indicated by the disappearance of the characteristic peaks of clinoptilolite. Zeolite can react with OPC (Ordinary Portland Cement) and lime and produce high strength products after autoclaving. A weak clinoptilolite peak or none at all is found in the sample of zeolite-based aerated concrete containing 80 wt. % zeolite and 20wt. % Portland cement after 3–6 hours autoclave curing at 170°–180° C., or after 8–14 hours moist-curing at 75°–85° C., or after 28 days moist-curing at 23° C.

Zeolite plays two important roles in the production of aerated concrete products of the invention: air generation and strength contribution. It is apparent that the particle size of zeolite affects the density and strength of zeolite-based lightweight concrete. The water requirement increases linearly with the increase of fine particles of zeolite due to greater surface area. Satisfactory values of density and strength can be obtained for aerated concrete containing zeolite having about 40–60 wt. % particles less than 0.175 mm in diameter, and at least 85 wt. % having particle size less than about 0.295 mm. Optimum fineness of zeolite for non-aerated lightweight concrete is in the range of 75–85 wt. % (at least 75 wt. %) particles passing 0.175 mm sieve. The fines contribute mostly to the strength because of pozzolanic activity. The large particles, 0.2–1.0 mm contribute to air generation. Strength decreases when the amount of fine particles exceeds a certain threshold value as there is a higher water requirement for workability.

The mixing and curing procedures for non- or low-aerated zeolite-based concrete products using natural or calcined zeolite (above 800° C.) are the same as conventional procedures for masonry products, steam-cured or autoclave-cured. Special mixing and pre-storage procedures should be employed in production of zeolite-based aerated concrete products. The mixing time should be sufficiently short i.e. within 2–5 minutes as the air bubbles are mostly generated in about 10–25 minutes. The mixture should be pre-stored for 30–60 minutes for air-generation and volume expansion of the concrete until the mixture develops sufficient hardness to be shaped. The mixture can then be autoclaved. Autoclaved products should be cured at 170°–180° C. for 3–6 hours to obtain ultimate strength. High temperature cured products should be moist-cured at 75°–85° C. for 8–14 hours to obtain sufficient demoulding strength, about 50–80% of the ultimate strength. The ultimate strength for such concrete can be developed after 3–6 months room temperature curing. Low temperature cured products should be moist-cured at 20°–38° C. for 28 days to achieve 50–80% of the ultimate strength. The ultimate strength for such concrete can be developed after another 3–6 months' room temperature curing.

Cost considerations would suggest the use of a low content of Portland cement. A certain minimum amount of OPC in the product is necessary to achieve sufficient compressive strength. Strength development of autoclaved concrete products depends primarily on the CaO/SiO$_2$ ratio of the hydration system. Strength therefore is not proportional to the amount of Portland cement used. Test results indicate that the optimum content of Portland cement in zeolite-based concrete products should be 20–50%. The optimum cement content will change with zeolite source. The water required for the concrete mixture increases with a decrease of Portland cement content in the concrete and correspondingly the dry density and compressive strength of the concrete products decreases. For example, a typical dry density value is at 1000 kg/m$^3$ for the concrete containing 50 wt. % zeolite and 50 wt. % Portland cement. It is reduced about 100 kg/m$^3$ when zeolite content increases to about 80 wt. % and Portland cement content decreases to about 20 wt. %.

The effects of lime content on dry density and compressive strength of aerated concrete depend on effective silica (SiO$_2$) content. An optimum lime content will provide just sufficient calcium to react with silica to form calcium silicate hydrates and/or calcium aluminosilicate hydrates. For example, when the lime content is less than 10 wt. % of solid (zeolite and OPC), dry density decreases with the increase of lime content, and the compressive strength increases. A further increase of lime content to exceed the requirement for hydration and formation of calcium silicates reduces the compressive strength of zeolite-based concrete. The optimum value will change with zeolite source.

Fine silica particles have been proven to be a major strength contributor in autoclaved concrete products. Zeolite contains at least 60% silica that may contribute to the strength. High silica content increases dry density. For example, a zeolite-based concrete product containing 9.6% silica flour had a 10% increase in dry density but double value of the compressive strength.

Silica sand as an aggregate in zeolite-based concrete products will also contribute to the strength. High silica sand content also increases dry density. For example, the compressive strength of the concrete increased from 6.7 to 9.2 MPa with an increase of sand content from 9 to 17 wt. % of solids (zeolite and Portland cement). A further increase of sand content significantly reduced strength. Crushed zeolite rock having the size of 2–6 mm in diameter can be used in zeolite-based concrete products as lightweight aggregate to minimize microcracks due to drying shrinkage as the products were cured at ambient pressure. The zeolite aggregate/solids (zeolite powder and Portland cement) weight ratio was suggested in the range of 1–1.5. No significant change on the compressive strength of the products was found when zeolite aggregate was added in this range.

A number of factors affect the water requirement of mixtures containing zeolite, including zeolite fineness and source, mix proportions, etc. The water content of the mixture should be such that satisfactory workability and air-generation is achieved.

Salts containing sodium ions, such as sodium sulphate, sodium nitrate, sodium chloride, etc., and salts containing sulphate ions, such as calcium sulphate and potassium sulphate, can be used as strengthening agents in the production of zeolite-based lightweight concrete products. Research indicates that sodium and sulphate ions can activate the pozzolanic activity of zeolite to form calcium aluminosilicate hydrates, e.g. strätlintgite ($C_2ASH_8$). Sodium and sulphate ions may substitute in some structural positions of calcium aluminosilicate crystals and reduce crystallization energy. These salts will significantly enhance the strength of zeolite-based concrete products. For example, the compressive strength of a zeolite-based concrete product increased from 10 to 18 MPa when 5% sodium sulphate by weight of zeolite and Portland cement was added. The sodium sulphate content used is usually in the range of 3–8% by weight of solids (zeolite and Portland cement) to achieve high strength.

Superplasticizers, such as sodium sulfonated napthalene formaldehyde (SNF), sodium sulfonated melamine formaldehyde (SMF), etc., can also be used to increase the strength of zeolite-based lightweight concrete products. For example, the compressive strength of the product doubled when 1% SMF by weight of solid (zeolite and Portland cement) was used to reduce water in the mixture by 16%. The content of superplasticizer used is usually in the range of 0.5–1.5% by weight of the solid (zeolite and Portland cement).

Mineral fibre such as wollastonite can be used to strengthen zeolite-based cement matrices and prevent microcrack formation due to drying shrinkage. Wollastonite is a naturally occurring calcium metasilicate having an acicular particle morphology. The composition of wollastonite includes about 50% $SiO_2$ and 47% CaO. Addition of wollastonite does not reduce the value of drying shrinkage of the products. However, microcracks due to drying shrinkage can be significantly reduced on the surface of the product containing 15–20% wollastonite by weight of solids (zeolite and Portland cement).

Air-bubble-stabilization (ABS) agents, such as polyvinyl alcohol (PVA), oxidized paraffin soap ($C_nH_{2n+1}COONa$, n=5–22), oleic acid-triethanolamine-water mixture ($C_{17}H_{33}COOH:N(C_2H_4OH)_3: H_2O= 1:3:36$ by weight), etc., have been widely used in the production of aerated concrete to stabilize and optimize the cellular structure. Our research indicated that these ABS agents were also beneficial to calcined zeolite based aerated concrete (zeolite being calcined at 400°–600° C.). The ABS agent was added in the mix-water before mixing. The concrete which contained ABS agent showed a better workability and more uniform cellular structure. The content of the ABS agent was 0.1–0.6 wt. % by the total weight of zeolite and Portland cement in the cementing material.

Figure 2:
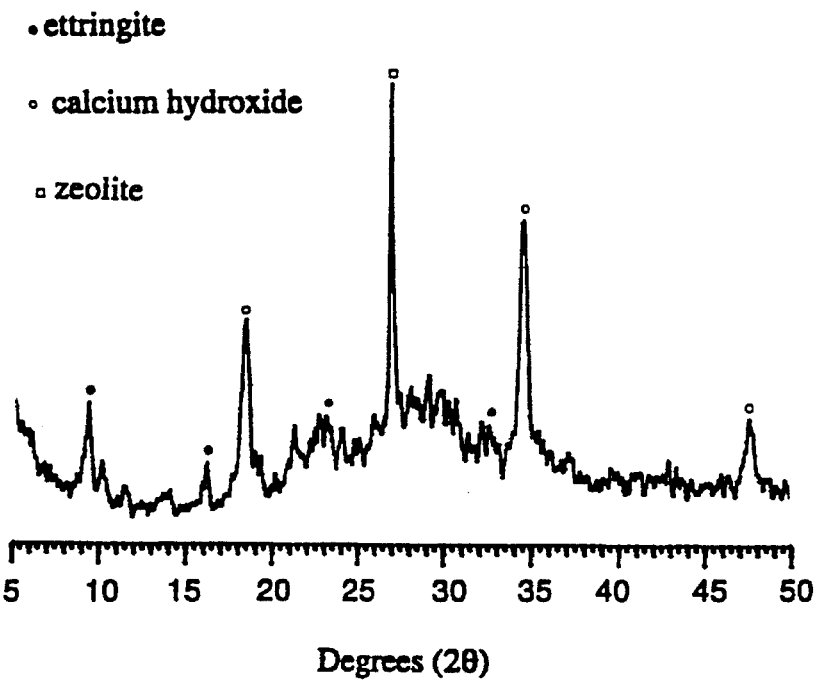
FIG. 2 illustrates X-ray diffraction analysis of ettringite formation in the zeolite-lime-calcium sulphate-sodium sulphate-water system.

Our tests have shown that large amount of ettringite (Aft phase) form in the zeolite-lime-hemihydrate-sodium sulphate-water system (FIG. 2). This is attributed to the reaction between the alumina phase in zeolite and the sulphate in presence of calcium. Addition of aluminum sulphate will significantly increase the formation of ettringite. This hydration system is believed to be well suitable for hazardous waste stabilization. The stabilization mechanisms can be explained as follows:

(1) The mixture containing zeolite, lime, hemihydrate, aluminum sulphate and sodium sulphate sets rapidly in about 10–20 minutes. This allows the hazardous waste to be quickly fixed.

(2) Zeolite as a major component will adsorb a large amount of heavy metal ions in a very short period because of its physical adsorption characteristics.

(3) These adsorbed heavy metal ions can be substituted in the crystal structure of the Aft phase during hydration. Ettringite, in which heavy metal ions have been fixed, is stable and has very low solubility at normal ambient temperature. The leakage of heavy metal ions from such waste solidified material therefore is expected to be significantly reduced. Compositions for use in hazardous waste stabilization include 40–60 wt. % natural zeolite, 15–20 wt. % lime, 15–20 wt. % hemihydrate ($CaSO_4 \bullet \frac{1}{2}H_2O$), 3–8 wt. % sodium sulphate and 0–8 wt. % aluminum sulphate. In example 10, below, a water solution containing 0.625 wt % $CdCl_2$ by total solid was added to the mixture. The material was mixed for 3 minutes and then cast in moulds. Setting time of the mixture was about 15 minutes. The compressive strength of stabilized materials was determined after 28 days moist-curing at 23° C. The compressive strength was 7 to 12 MPa. X-ray diffraction analysis was carried out on the samples also after 28 days curing. A strong ettringite peak was detected.

EXAMPLE 1

This example illustrates the use of calcined zeolite (550° C.) to produce aerated concrete products having very low density. Applications include insulation and/or low load bearing blocks for construction. The test results are shown in the following table:

| | Composition (arbitrary wt. units) | | | | | | Properties | |
|---|---|---|---|---|---|---|---|---|
| No. | zeolite* | portland cement | lime | silica flour | silica sand | water | bulk density (kg/m³) | compressive strength (MPa) |
| 1 | 2 | 1 | — | — | — | 1.32 | 490 | 0.37 |
| 2 | 2 | 1 | — | — | 0.3 | 1.32 | 500 | 1.80 |
| 3 | 2 | 1 | 0.27 | 1.15 | — | 1.41 | 560 | 2.60 |

*Zeolite in this test was from Greenhrae, CA, USA and calcined at 550° C. for 2 hours. The zeolite in test No. 1 had 72.6% particles larger than 0.175 mm and 5.5% particles larger than 0.295 mm. The zeolite in test No. 2 and 3 had 15.3% particles larger than 0.175 mm.

The zeolite used in this test was quite pure and able to generate a large amount of air bubbles. The coarse zeolite resulted in lower density and strength in the products. The aerated concrete products made by this zeolite had low value of bulk density and compressive strength after autoclave curing at 178° C. for 3 hours.

EXAMPLE 2

This example illustrates the use of calcined zeolite (500° C.) to produce aerated concrete products having low density and high strength for use as load bearing wall material for construction. The effect of silica flour, silica sand and zeolite particle size are also demonstrated. The test results are shown in following table:

| | Composition (arbitrary wt. units) | | | | | | Properties | |
|---|---|---|---|---|---|---|---|---|
| No. | zeolite* | portland cement | lime | silica sand | PVA | water | bulk density (kg/m³) | compressive strength (MPa) |
| 1 | 3.5 | 1 | 0.4 | — | — | 2.21 | 925 | 7.6 |
| 2 | 3.5 | 1 | 0.4 | 0.43 | 0.93 | 2.21 | 1051 | 10.3 |
| 3 | 3.5 | 1 | 0.27 | — | 0.80 | 2.21 | 1231 | 16.4 |
| 4 | 3.5 | 1 | 0.27 | — | 0.80 | 2.21 | 960 | 4.9 |
| 5 | 2.0 | 1 | — | — | — | 1.28 | 700 | 7.3 |

*Zeolites in test No. 1–4 were from Western Canada, and calcined at 500° C. for 2 hours. Particle size: No. 1 and 2 zeolite have 15.3% particles larger than 0.175 mm; No. 3 zeolite has 15.1% particles larger than 0.075 mm; No. 4 zeolite has 72.6% particles larger than 0.175 mm and 5.5% particles larger than 0.295 mm. Zeolite in test No. 5 was from Greenhrae, CA, USA, and calcined at 550° C. for 2 hours. It had 15.3% particles larger than 0.175 mm.

The zeolite used in this test had lower purity and generated less air bubbles than the zeolite used in example 1. The bulk density of the concrete after autoclave curing at 178° C. for 3 hours was much higher than that of the concrete in example 1 even though the zeolite content in this case was higher. Correspondingly higher compressive strength was obtained. The addition of silica flour and silica sand in the No. 2 mixture apparently increases the compressive strength and density. The zeolite containing coarse particles (No.4) resulted in a lower bulk density and strength in aerated concrete products than the fine zeolite (No. 3) due to the particle size effect discussed above. Zeolite in test No.5 produced lower density product than those used in test No. 1–4.

EXAMPLE 3

This example illustrates the use of natural zeolite to produce high strength lightweight concrete products for use in wall construction and for roofing materials for construction. The test results are shown in the following table:

| Composition (arbitrary wt. units) | | | | | Properties | |
|---|---|---|---|---|---|---|
| zeolite* | portland cement | lime | silica sand | water | bulk density (kg/m³) | compressive strength (MPa) |
| 3.5 | 1 | 0.27 | 1.35 | 2.79 | 1210 | 14.4 |

*Zeolite in this test was from Western Canada, and not pre-treated. It had 15.3% particles larger than 0.175 mm.

The zeolite was not calcined. Since its high surface area required more water to satisfy the workability requirement, the concrete made by natural zeolite still had low bulk density after autoclave curing at 178° C. for 3 hours. The compressive strength of the concrete product was higher due to the high pozzolanic activity of the zeolite. This product can be used in wall and construction for roofing material manufacture.

EXAMPLE 4

This example illustrates the use of high temperature calcined zeolite to produce lightweight concrete products having high strength for use in heavy load bearing wall construction and roof unit manufacture. The test results are shown in the following table:

| Composition (arbitrary wt. units) | | | | | Properties | |
|---|---|---|---|---|---|---|
| zeolite* | portland cement | lime | silica sand | water | bulk density (kg/m³) | compressive strength (MPa) |
| 3.5 | 1 | 0.27 | 1.35 | 2.21 | 1461 | 26.9 |

*Zeolite in this test was from Western Canada and calcined at 800° C. for 2 hours. It had 15.3% particles larger than 0.175 mm.

The zeolite was pre-treated at high temperature. The zeolite lost its ability of generating air bubbles after the high temperature calcination due to its decomposition. The calcination treatment appeared to increase the pozzolanic activity of zeolite. The concrete product made with such a zeolite had high compressive strength after autoclave curing at 178° C. for 3 hours. This product can be used as high load-bearing material for wall units and roof slabs.

EXAMPLE 5

This example illustrates the use of zeolites to produce lightweight low cost concrete products cured at normal temperature for other applications including blended masonry cement, landfill lining, soil strengthening, etc. The test results are shown in the following table:

| | Composition (arbitrary wt. units) | | | Properties | |
|---|---|---|---|---|---|
| No. | zeolite* | portland cement | water | bulk density (kg/m³) | compressive strength (MPa) |
| 1 | 3 | 1 | 2.0 | 1216 | 19.0 |
| 2 | 3 | 1 | 2.1 | 985 | 24.5 |

*Zeolite in this test was from Western Canada. No. 1 zeolite had 72.6% particles larger than 0.175 mm and 5.5% particles larger than 0.295 mm; No. 2 zeolite had 15.3% particles larger than 0.175 mm.

The properties of the products were measured after 28 days hydration at 23° C. in moisture. It is clear that zeolite-based lightweight concrete products can also be produced using normal-temperature curing. A sufficient strength and low bulk density can be obtained at 28 days. The product made by zeolites containing more fine particles had higher compressive strength and lower bulk density. This material can be used as masonry cement, grouting cement or other applications where long-term moisture curing is available.

EXAMPLE 6

This example illustrates the use of zeolite to produce lightweight concrete products produced by steam-curing for use in construction. The test results are shown in the following table:

| | Composition (arbitrary wt. units) | | | | | Properties | |
|---|---|---|---|---|---|---|---|
| No. | zeolite* | portland cement | lime | silica sand | water | bulk density (kg/m³) | compressive strength (MPa) |
| 1 | 3.6 | 1 | 0.27 | 1.35 | 2.31 | 1306 | 10.8 |
| 2 | 3.6 | 1 | 0.27 | 1.35 | 2.31 | 1321 | 11.3 |
| 3 | 3.6 | 1 | 0.27 | 1.35 | 2.54 | 1126 | 2.5 |
| 4 | 3.6 | 1 | 0.27 | 1.35 | 2.76 | 1300 | 12.1 |

*Zeolites in tests No. 1–3 were from Western Canada. The zeolite was calcined at 800° C. for 2 hours in test No. 2 and it was calcined at 550° C. for 2 hours in test No. 3. The zeolite in test No. 4 was also from Western Canada but from a different location. The particle size of the zeolite used here had 15.3% particles larger than 0.175 mm.

The properties of the products were measured after 12 hours moist curing at 85° C. Zeolite-based lightweight concrete products can also be produced by steam curing. The compressive strength of steam cured products is lower than that by autoclave curing.

EXAMPLE 7

This example illustrates the use of chemical admixtures in production of lightweight concrete products to increase their strength. The test results are shown in the following table:

| | Composition (arbitrary wt. units) | | | | | | Properties | |
|---|---|---|---|---|---|---|---|---|
| No. | zeolite* | portland cement | lime | silica sand | admixture | water | bulk density (kg/m³) | compressive strength (MPa) |
| 1 | 3.6 | 1 | 0.27 | 1.35 | — | 2.31 | 1306 | 10.8 |
| 2 | 3.6 | 1 | 0.27 | 1.35 | $Na_2SO_4$ | 2.31 | 1268 | 18.2 |

|  | Composition (arbitrary wt. units) | | | | | | Properties | |
|---|---|---|---|---|---|---|---|---|
| No. | zeolite* | portland cement | lime | silica sand | admixture | water | bulk density (kg/m³) | compressive strength (MPa) |
| 3 | 3.6 | 1 | 0.27 | 1.35 | 0.23 Na₂NO₃ | 2.31 | 1319 | 17.0 |
| 4 | 3.6 | 1 | 0.27 | 1.35 | 0.23 SMF 0.03 | 1.92 | 1376 | 21.1 |

*Zeolites in this test was from Western Canada. The particles size distribution of the zeolite had 15.3% particles larger than 0.175 mm.

The properties of the products were measured after 12 hours moist-curing at 85° C. The strength of zeolite-based lightweight concrete products can be significantly enhanced by adding sodium sulphate and sodium nitrate, or by adding superplasticizer (sodium sulfonated melamine formaldehyde).

EXAMPLE 8

This example illustrates the production of low cost lightweight concrete products made by zeolite, lime, sand and a small amount of chemical admixture for use in construction and soil strengthening. The test results are shown in the following table:

|  | Composition (arbitrary wt. units) | | | | | Properties | |
|---|---|---|---|---|---|---|---|
| No. | zeolite* | sand | lime | Na₂SO₄ | water | bulk density (kg/m³) | compressive strength (MPa) |
| 1 | 1 | 0.37 | 0.15 | — | 0.75 | 1257 | 7.3 |
| 2 | 1 | 0.37 | 0.15 | 0.06 | 0.75 | 1333 | 11.9 |
| 3 | 1 | — | 0.20 | — | 0.71 | 1028 | 9.7 |

*Zeolites in this test were from Western Canada. The particle size distribution of the zeolite had 15.3% particles larger than 0.175 mm.

The properties of the products in test No. 1 and 2 were measured after 12 hours moist-curing at 85° C. The strength of zeolite-based lightweight concrete products can be enhanced about 63% by adding sodium sulphate. The properties of the products in test No. 3 were measured after 28 days moist-curing at 23° C.

EXAMPLE 9

This example illustrates the use of crushed zeolite aggregate and the mineral admixture wollastonite in production of lightweight concrete products to prevent cracks due to drying shrinkage. The test results are shown in the following table:

|  | Composition (arbitrary wt. units) | | | | | | | Properties | | |
|---|---|---|---|---|---|---|---|---|---|---|
| No. | zeolite* | portland cement | lime | sodium sulfate | zeolite aggregate | wollastonite | water | drying shinkage (%) | bulk density (kg/m³) | compressive strength (MPa) |
| 1 | 3.6 | 1 | 0.27 | — | 6.9 | — | 2.92 | 0.02 | 1305 | 11.1 |
| 2 | 3.6 | 1 | 0.27 | 0.23 | 6.9 | — | 2.92 | 0.03 | 1336 | 15.6 |
| 3 | 3.6 | 1 | 0.27 | 0.23 | — | 0.70 | 2.31 | 0.06 | 1290 | 14.1 |
| 4 | 3.6 | 1 | 0.27 | 0.23 | — | 0.92 | 2.31 | 0.07 | 1329 | 16.1 |

*Zeolite in this test was from Western Canada. The particle size distribution of the zeolite had 15.3% particles larger than 0.175 mm. The size of zeolite aggregate is 2–6 mm in diameter.

The properties of the products in the tests were measured after 12 hours moist-curing at 85° C. The addition of wollastonite did not reduce the total drying shrinkage of the products. It was concluded on the basis of optical microscopy however that the number of microcracks on the surface of the products was reduced.

EXAMPLE 10

This example illustrates the use of natural zeolite in production of binding material for use in hazardous waste stabilization. The test results are shown in the following table:

| Composition (arbitrary wt. units) | | | | | | | Properties | |
| --- | --- | --- | --- | --- | --- | --- | --- | --- |
| zeolite* | Ca(OH) | hemihydrates $CaSO_4 \cdot 1/2H_2O$ | $Na_2SO_4$ | $Al_2(SO_4)_3$ | $CdCl_2$ | water | setting time (minutes) | compressive strength (MPa) |
| 1 | 0.33 | 0.33 | 0.08 | 0.08 | 0.01 | 0.89 | 15 | 7.5 |

*Zeolite in this test was from Western Canada. The particle size of the zeolite had 15.3% particles larger than 0.175 mm.

The zeolite-based binding materials have sufficient compressive strength at 28 days to be used as blocks. The fast setting characteristics make the materials useful for waste stabilization. X-ray diffraction analysis indicated that large amount of ettringite formed in the hardened waste stabilization material.

INDUSTRIAL APPLICABILITY

This invention addresses industry needs for utilization of more earth materials at lowest possible cost. Zeolite is one of the most abundant earth materials in the world. The commercial use of natural zeolites is still in its infancy. However, a total of more than 300,000 tons of zeolitic tuff is mined each year in the United states, Japan, China, Italy, Hungary, Bulgaria, Yugoslavia, Mexico, Korea, Canada and Germany. It is apparent that the application of zeolite as a major component in production of lightweight concrete products and binding material for waste stabilization will benefit the construction industry and environmental engineering in general. The raw materials for production of the products of the invention are commercially available. They can be manufactured with existing precast-concrete-plant equipment.

We claim:

1. A lightweight concrete product comprising 40–100 wt. % cementing material and 0–60 wt. % aggregate, and having dry bulk density 300–1600 kg/m³ and compressive strength 0.3–35 MPa after 3–6 hours autoclave curing at 170°–180° C. or after 8–14 hours moist-curing at 75°–85° C., or after 28 days moist-curing at 23° C., wherein said cementing material comprises about 50–80 wt. % of zeolite which is either non-calcined or calcined above 800° C., 20–49 wt. % Portland cement and 1–8 wt. % strengthening agent.

2. The lightweight concrete product according to claim 1, having compressive strength 10–35 MPa and dry bulk density 1000–1600 kg/m³, wherein the cementing material comprises about 50–80 wt. % zeolite, 20–49 wt. % Portland cement, 0–5 wt. % lime, 0–10 wt. % silica flour and 1–8 wt. % strengthening agent.

3. The product of claim 1, wherein said aggregate is crushed zeolite rock having the size of 2–6 mm in diameter, or normal construction sand.

4. The product of claim 1, wherein said strenghtening agent is at least one compound selected from the group consisting of sodium sulphate, calcium sulphate, potassium sulphate and sodium nitrate.

5. The product of claim 1, wherein the strengthening agent is sodium sulphate.

6. The product according to claim 1, further comprising a superplasticizer effective to increase the strength of said binding material, in the amount of 0.5–1.5 % by total weight of the zeolite and Portland cement in said cementing material.

7. The product according to claim 1, further comprising wollastonite mineral fiber in the amount of 10–20% by total weight of zeolite and Portland cement in said cementing material.

8. The product according to claim 1, wherein at least 75 wt. % of said zeolite have a particle size less than about 0.175 mm.

9. A lightweight concrete product comprising 40–100 wt. % cementing material and 0–60 wt. % aggregate, and having dry bulk density 1000–1600 kg/m³ and compressive strength 4–18 MPa after 3–6 hours autoclave curing at 170°–180° C. or after 8–14 hours moist-curing at 75°–85° C., or after 28 days moist-curing at 23° C., wherein the cementing material comprises 60–80 wt. % zeolite which is either non-calcined or calcined at above 800° C. 10–20 wt % lime, 0–15 wt % silica flour and 1–8 wt. % strengthening agent.

10. The product of claim 9, wherein said aggregate is crushed zeolite rock having the size of 2–6 mm in diameter, or normal construction sand.

11. The product of claim 9, wherein said strenghtening agent is at least one compound selected from the group consisting of sodium sulphate, calcium sulphate, potassium sulphate and sodium nitrate.

12. The product according to claim 9, wherein the strengthening agent is sodium sulphate.

13. The product according to claim 9, further comprising wollastonite mineral fiber in the amount of 10–20% by the weight of zeolite in said cementing material.

14. The product according to claim 9, wherein at least 75 wt. % of said zeolite have a particle size less than about 0.175 mm.

15. A lightweight concrete product comprising 40–100 wt. % cementing material and 0–60 wt. % aggregate, and having compressive strength 0.3–12 MPa and dry bulk density of 300–1100 kg/m³ after 3–6 hours of autoclave curing at 170°–180° C., wherein the cementing material comprises 55–79 wt. % of zeolite calcined at 400°–600° C., 20–44 wt. % Portland cement, 0–5 wt. % lime, 0–10 wt. % silica flour and 1–8 wt. % strengthening agent.

16. The product according to claim 15, wherein said aggregate is crushed zeolite rock having the size of 2–6 mm in diameter, or normal construction sand.

17. The product according to claim 15, wherein said strengthening agent is at least one compound selected from the group consisting of sodium sulphate, calcium sulphate, potassium sulphate and sodium nitrate.

18. The product according to claim 15, further comprising a superplasticizer effective to increase the strength of said binding material, in the amount of 0.5–1.5 % by total weight of the zeolite and Portland cement in said cementing material.

19. The product according to claim 15, further comprising wollastonite mineral fiber in the amount of 10–20% by the total weight of zeolite and Portland cement in said cementing material.

20. The product according to claim 15, further comprising an air-bubble-stabilization agent in the amount of 0.1–0.6% by the total weight of zeolite and Portland cement in said cementing material.

21. The product according to claim 15, wherein about 40–60 wt. % of said zeolite have a particle size less than about 0.175 mm, and at least 85 wt. % of said zeolite have a particle size less than about 0.295 mm.

22. A binding material for use in hazardous waste stabilization, comprising 40–60 wt. % zeolite, 15–20 wt. % lime, 15–20 wt. % calcium sulphate hemihydrate ($CaSO_4 \cdot \frac{1}{2}H_2O$), 3–8 wt. % sodium sulphate and 0–8 wt. % aluminum sulphate, having a setting time about 10–20 minutes and compressive strength 5–15 MPa after 28 days moist-curing at 23° C. or after 8–14 hours moist-curing at 75°–85° C.

23. The binding material of claim 22, wherein the zeolite is non-calcined zeolite.

* * * * *